(12) United States Patent
Wiechman et al.

(10) Patent No.: US 9,961,194 B1
(45) Date of Patent: May 1, 2018

(54) SYSTEMS AND METHODS FOR AUTHENTICATING A CALLER AT A CALL CENTER

(71) Applicant: State Farm Mutual Automobile Insurance Company, Bloomington, IL (US)

(72) Inventors: Lucas Wiechman, Bloomington, IL (US); Matthew Burgund, Bloomington, IL (US); Mark Biersdorf, Bloomington, IL (US); Dan Hlavac, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days. days.

(21) Appl. No.: 15/474,631

(22) Filed: Mar. 30, 2017

Related U.S. Application Data

(60) Provisional application No. 62/318,560, filed on Apr. 5, 2016, provisional application No. 62/345,473, filed on Jun. 3, 2016.

(51) Int. Cl.
*H04M 1/56* (2006.01)
*H04M 15/06* (2006.01)
(Continued)

(52) U.S. Cl.
CPC ... *H04M 3/42068* (2013.01); *H04M 3/42042* (2013.01); *H04M 3/523* (2013.01);
(Continued)

(58) Field of Classification Search
CPC ............. G06Q 20/322; G06Q 20/3821; G06Q 20/385; G06Q 20/4014; G06Q 20/425;
(Continued)

(56) References Cited

U.S. PATENT DOCUMENTS

| 7,099,445 B2 * | 8/2006 | Creamer ........... H04M 3/42042 370/352 |
| 8,505,085 B2 | 8/2013 | Logan et al. |

(Continued)

OTHER PUBLICATIONS

Daon, White Paper—"Implementing a Mobile Biometric Authentication Solution", pdf acquired Nov. 6, 2017, 5 pps., url: www.daon.com.

*Primary Examiner* — Binh Kien Tieu
(74) *Attorney, Agent, or Firm* — Armstrong Teasdale LLP

(57) ABSTRACT

A system for authenticating the identity of a caller (i) receives a phone call from a caller, where the phone call is initiated through an application on a remote computer device associated with the caller, and where the phone call includes one or more phone authentication credentials; (ii) determines a preliminary identity of the caller based upon the one or more phone authentication credentials; (iii) receives online authentication credentials from the application on the remote computer device; (iv) determines a confirmed identity of the caller based, at least in part, upon the one or more online credentials and the preliminary identity of the caller; and (v) displays the confirmed identity of the caller to a user answering the phone call. As a result, the user and/or the system do not need to perform additional authentication before providing service to the caller.

20 Claims, 12 Drawing Sheets

(51) Int. Cl.
*H04M 3/42* (2006.01)
*H04M 3/523* (2006.01)
*H04M 7/00* (2006.01)

(52) U.S. Cl.
CPC ...... *H04M 7/006* (2013.01); *H04M 2203/558* (2013.01); *H04M 2203/60* (2013.01)

(58) Field of Classification Search
CPC ............ G06Q 30/0277; H04L 63/0428; H04L 63/0876; H04L 63/0853; H04L 63/0861; H04M 15/06; H04M 15/43; H04M 3/42042
USPC ............ 379/142.01, 142.05, 142.06, 142.04, 379/142.17
See application file for complete search history.

(56) References Cited

U.S. PATENT DOCUMENTS

| | | | |
|---|---|---|---|
| 9,001,977 B1 | 4/2015 | Ramalingam et al. | |
| 9,277,049 B1 | 3/2016 | Danis | |
| 9,609,129 B2* | 3/2017 | Westlake | H04M 3/5183 |
| 9,767,482 B1* | 9/2017 | Cooper | H04M 3/4936 |
| 2003/0163739 A1 | 8/2003 | Armington et al. | |
| 2005/0091213 A1* | 4/2005 | Schutz | G06F 21/31 |
| 2005/0281401 A1* | 12/2005 | Creamer | H04M 3/42042 379/142.06 |
| 2008/0181380 A1 | 7/2008 | Gustave et al. | |
| 2010/0132019 A1 | 5/2010 | Hardt | |
| 2011/0038470 A1* | 2/2011 | Kent | H04M 1/575 379/142.04 |
| 2011/0142234 A1* | 6/2011 | Rogers | G06F 21/35 380/247 |
| 2012/0323717 A1* | 12/2012 | Kirsch | G06Q 20/0855 705/26.1 |
| 2013/0195258 A1* | 8/2013 | Atef | H04L 67/34 379/88.01 |
| 2013/0244632 A1* | 9/2013 | Spence | H04M 3/51 455/415 |
| 2016/0014278 A1* | 1/2016 | Defoort | H04L 63/18 379/142.05 |
| 2016/0036801 A1* | 2/2016 | Caldwell | H04L 63/08 726/6 |
| 2016/0110717 A1* | 4/2016 | Pitroda | G06Q 20/02 705/75 |
| 2016/0344730 A1* | 11/2016 | Holz | H04L 63/0876 |

* cited by examiner

SYSTEMS AND METHODS FOR AUTHENTICATING A CALLER AT A CALL CENTER

RELATED APPLICATIONS

This application claims priority to U.S. Provisional Patent Application No. 62/318,560, filed Apr. 5, 2016, entitled "SYSTEMS AND METHODS FOR AUTHENTICATING A CALLER AT A CALL CENTER" and U.S. Provisional Patent Application No. 62/345,473, filed Jun. 3, 2016, the entire contents and disclosure of which are hereby incorporated by reference herein in their entirety.

FIELD OF THE INVENTION

The present disclosure relates to authenticating a caller and, more particularly, to a network-based system and method for authenticating an identity of a caller based upon attributes of the phone call and online credentials of an active user session.

BACKGROUND

There are a small number of credentials available for authenticating in-bound customers in a call center. Call centers may currently rely on traditional verbal interactions with customers through the use of customer verification, PIN codes, Knowledge Based Authentication questions, as well as Automatic Number Identification (ANI) and Dialed Number Identification Service (DNIS). Using verbal interactions may take time and potentially annoy the customer. Two additional non-traditional methods available may include user enrolled voice biometrics and phone print (phone as an ownership token). These technologies exist in helping to identify a customer but are not as secure as online credentials.

BRIEF SUMMARY

The present embodiments may relate to systems and methods for authenticating a caller. A caller authenticating system, as described herein, may include a call authenticating ("CA") computer device that is in communication with a remote computer device associated with a caller. The CA computer device may be configured to (1) receive a phone call from a caller, where the phone call is initiated through an application processing or executing on a remote computer device associated with the caller and where the phone call includes one or more phone authentication credentials that include at least one of (i) a phone authentication system; (ii) data verification system; (iii) automatic number identification; (iv) dialed number identification service; and (v) a root check system result; (2) place the received phone call in a queue; (3) compare the one or more phone authentication credentials with a stored database of identities; (4) determine the preliminary identity of the caller based upon the comparison; (5) receive online authentication credentials from the application on the remote computer device, wherein the online authentication credentials include at least one of a mobile device print, geolocation data, a user fingerprint, facial recognition information, public key infrastructure token, QR code, pincode, and username+password; (6) compare the one or more online credentials with the preliminary identity and the database of identities; (7) determine a confirmed identity of the caller based upon the comparison; (8) release the phone call from the queue based upon determining a confirmed identity of the caller; and/or (9) display the confirmed identity of the caller to a user answering the phone call including a caller name and a phone number associated with the phone call.

At least one advantage of this system is that verification of a caller is performed behind the scenes, and the caller does not have to take extra actions beyond logging into the application and hitting the call button to perform authentication and verification. This may reduce the time that the caller has to jump through hoops before being able to discuss the reason for his or her call to the call center associate. Another advantage of the system is that the system described herein may provide the call center associate with a higher level of assurance that the caller is who he or she claims to be, and therefore allows the call center associate more confidence in providing information and assistance to the caller.

In one aspect, a computer system for authenticating the identity of a caller may be provided. The computer system may include at least one processor in communication with at least one memory device. The at least one processor may be configured or programmed to: (1) receive a phone call from a caller, where the phone call is initiated through an application operating on a remote computer device associated with the caller, and where the phone call includes one or more phone authentication credentials; (2) determine a preliminary identity of the caller based upon the one or more phone authentication credentials; (3) receive online authentication credentials from the application on the remote computer device; (4) determine a confirmed identity of the caller based, at least in part, on the one or more online credentials and the preliminary identity of the caller; and/or (5) display the confirmed identity of the caller to a user answering the phone call to facilitate quickly and automatically authenticating the identity of the caller to prevent the caller from being negatively impacted by lengthy and potentially annoying authentication procedures (e.g., answering a plurality of security questions and/or manually providing authentication information). The computer system may have additional, less, or alternate functionality, including that discussed elsewhere herein.

In another aspect, a computer-based method for authenticating the identity of a caller may be provided. The method may be implemented on a call authenticating ("CA") server that includes at least one processor in communication with at least one memory device. The method may include: (1) receiving, at the CA server, a phone call from a caller, where the phone call is initiated through an application operating on a remote computer device associated with the caller, and where the phone call includes one or more phone authentication credentials; (2) determining, by the CA server, a preliminary identity of the caller based upon the one or more phone authentication credentials; (3) receiving, at the CA server, online authentication credentials from the application on the remote computer device; (4) determining, by the CA server, a confirmed identity of the caller based, at least in part, on the one or more online credentials and the preliminary identity of the caller; and/or (5) displaying the confirmed identity of the caller to a user answering the phone call facilitate quickly and automatically authenticating the identity of the caller to prevent the caller from being negatively impacted by lengthy and potentially annoying authentication procedures. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions may cause the processor to: (1) receive a phone call from a caller, where the phone call is initiated through an application operating on a remote computer device associated with the caller, and where the phone call includes one or more phone authentication credentials; (2) determine a preliminary identity of the caller based upon the one or more phone authentication credentials; (3) receive online authentication credentials from the application on the remote computer device; (4) determine a confirmed identity of the caller based, at least in part, on the one or more online credentials and the preliminary identity of the caller; and/or (5) display the confirmed identity of the caller to a user answering the phone call. The computer-executable instructions may direct additional, less, or alternate functionality, including that discussed elsewhere herein.

In still another aspect, a computer system for authenticating the identity of a caller may be provided. The computer system may include at least one processor, sensor, and/or transceiver in communication with at least one memory device, the at least one processor, sensor, and/or transceiver. The at least one processor may be programmed to (1) receive a phone call from a caller, where the phone call is initiated through an application operating on a remote computer device associated with the caller, and where the phone call includes one or more phone authentication credentials; (2) determine a preliminary identity of the caller based upon the one or more phone authentication credentials; (3) receive online authentication credentials from the application on the remote computer device; (4) determine a confirmed identity of the caller based, at least in part, on the one or more online credentials and the preliminary identity of the caller; and/or (5) display the confirmed identity of the caller to a user answering the phone call. The computer system may include additional, less, or alternate functionality, including that discussed elsewhere herein.

In a different aspect, a computer-based method for authenticating the identity of a caller may be provided. The method may include (1) receiving, via one or more processors and/or transceivers, a phone call from a caller, where the phone call is initiated through an application operating on a remote computer device associated with the caller, and where the phone call includes one or more phone authentication credentials; (2) determining, via the one or more processors, a preliminary identity of the caller based upon the one or more phone authentication credentials; (3) receiving, via the one or more processors and/or transceivers, online authentication credentials from the application on the remote computer device; (4) determining, via the one or more processors, a confirmed identity of the caller based, at least in part, on the one or more online credentials and the preliminary identity of the caller; and/or (5) displaying the confirmed identity of the caller to a user answering the phone call. The method may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
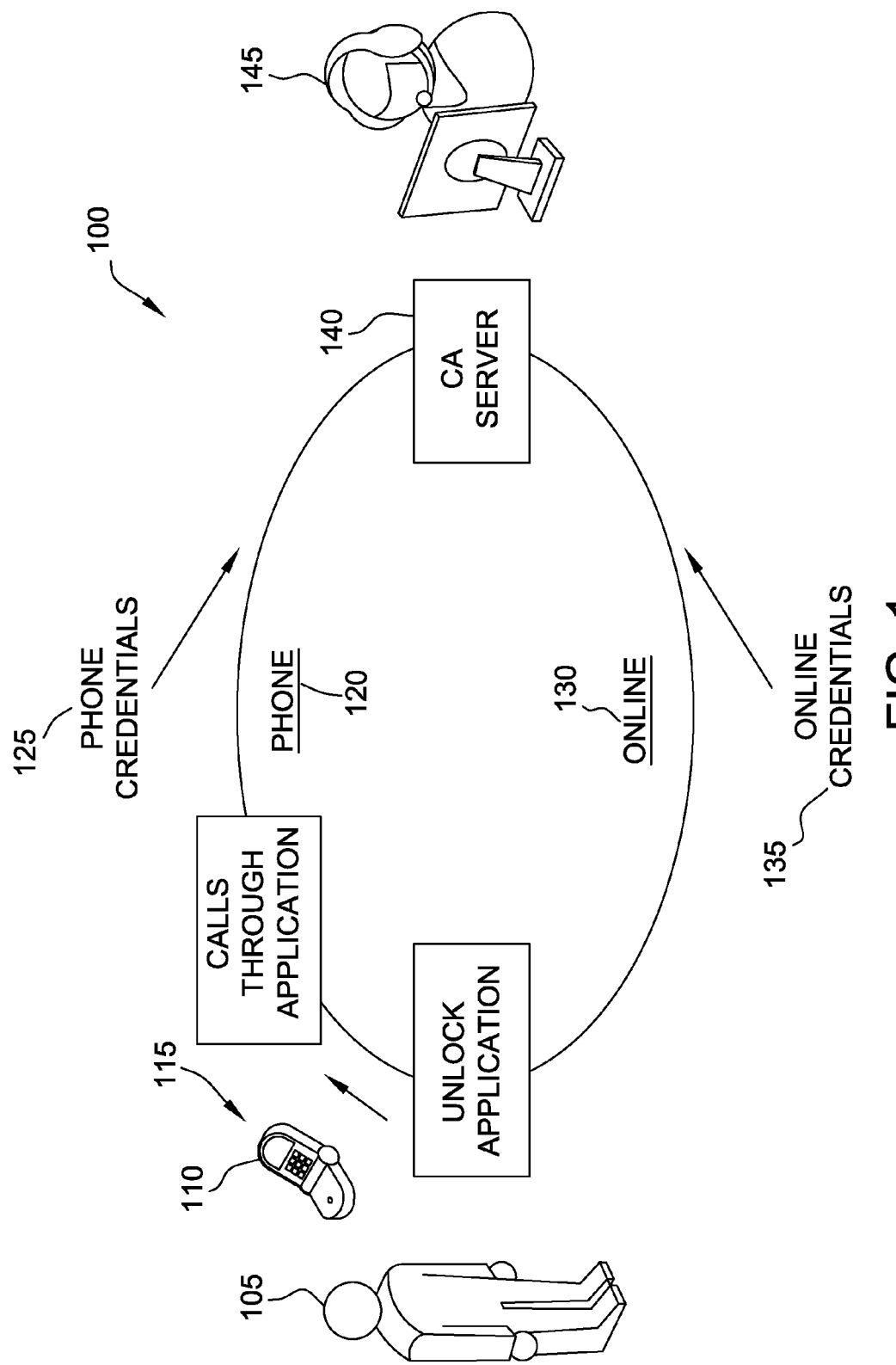
FIG. 1 illustrates a schematic diagram of a first exemplary embodiment of a process of authenticating a caller using authentication credentials from both phone and online sources.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for authenticating a caller by combining telephony based authentication with online authentication. In one exemplary embodiment, the process may be performed by a call authenticating ("CA") computer device, also known as a call authenticating ("CA") server.

In the exemplary embodiment, the caller may have registered with the provider of the application and the call center. The caller may have provided identification and authentication information that the provider stored in a database that is accessible by the CA server. For instance, caller may be a policyholder with an insurance provider. The application may be provided by the insurance provider, and the call center may be a call center for the insurance provider, such as a customer service call center.

In the exemplary embodiment, a caller may be associated with a remote computer device, such as a cellphone. The remote computer device may include at least one computer application (e.g., computer cookie or instance code executed by the user device). The application may require the caller to log in to unlock and/or activate the application. The application may be configured to initiate a phone call to a phone number. In the exemplary embodiment, the phone call may be placed to a call center, where the call center may be a customer service call center. In other embodiments, the phone call may be to an individual or to a business. In the exemplary embodiment, the application may be installed on the remote computer device, which is capable of placing cellular calls.

The application may initiate a phone call through a separate component or application on the remote computer device, such as a dialer application. In some embodiments, the dialer application may be integrated into the application. In other embodiments, the phone call may be initiated through a voice over IP (VoIP) application or component. For example, the remote computer device may be a tablet device without cellular capabilities.

When the application initiates the phone call, the application may open a connection to a call authenticating (CA) server through two paths. The first path is through the phone. In this path, the application may call the CA server through a phone call. This call may use a telephony-based connection. As a part of the phone call, the application or remote computer device may transmit phone credentials along with the phone call to the CA server. While the phone call is being initiated, the application also may make or may have already made a connection to the CA server through an online path. The application may transmit online credentials to the CA server.

Phone credentials may include, but are not limited to, automatic number identification (ANI), dialed number identification service results or inputs, phone authentication system inputs or results, and/or root check system results. Online credentials may include, but are not limited to, a mobile device print, geolocation data, a user fingerprint, facial recognition information, public key infrastructure token, QR code, pincode, username+password, and/or acknowledgment of a successful accessing of application (i.e., verification code). For example, online credentials may be the credentials that the caller entered into the application to activate the application. In other embodiments, online credentials may be the credentials that the caller used to activate the remote computer device.

A mobile device print may include one or more metadata attributes of the mobile device on which the application is currently running (i.e., software version, device number, etc.). This data may be compared to information about the device that the application was downloaded onto. Geolocation data may include data about where the remote device is located and may be compared to where the phone call is being routed from. A user fingerprint or facial recognition information may be taken when the user logins to the application or when the user logins to the remote device. In some embodiments, the application transfers the raw data for the online credentials to an authentication server or the CA server. In other embodiments, the application performs the verification check and transmits an indication of a successful verification to the CA server.

The CA server may use both phone credentials and online credentials to authenticate the caller. In the exemplary embodiment, the CA server may use phone credentials to determine a potential identity of the caller, such as matching the caller's phone number with the caller's name in a database. The CA server may then use online credentials to confirm the caller's identity by comparing one or more of the received online credentials with information stored in the database. The CA server may then display the confirmed identity of the caller to a user, such as a customer care associate. For example, the CA server may cause the caller's name and phone number to appear on a computer device associated with user/customer care associate.

In some embodiments, the CA server may manage a queue of callers, where phone calls from callers are placed into the queue while waiting until a customer care associate is available to handle the next call in a queue. When the CA server receives a call, the CA server may place the call in the queue while authenticating the identity of the caller. Once the identity of the caller has been confirmed, the CA server may then release the call from the queue and connect the call to the next available user/customer care associate.

In some embodiments, the caller may have registered with the provider of the application and the call center. The caller has provided identification and authentication information that the provider has stored in the database that is accessible by the CA server. For instance, the caller may be a policyholder with an insurance provider. The application may be provided by the insurance provider and the call center may be a call center for the insurance provider, such as a customer service call center. The database may be configured to store a plurality of pieces of information that may be used to confirm the identity of a caller.

In some embodiments, the identity of caller is associated with different levels of assurance. When the caller has been identified with the phone credentials, then the identity of the caller may be associated with at first level of assurance. When the identity of the caller has been confirmed with the online credentials, then the identity of the caller may be associated with a second level of assurance. The second level assurance being higher than the first level of assurance.

At least one of the technical problems addressed by this system may include: (i) improving speed and efficiency of authenticating a caller; (ii) obfuscating the authentication process from the caller to reduce the burden on the caller; (iii) saving time for the caller by removing the need to ask the caller authentication questions; and/or (iv) providing multi-factor authentication for the identity of callers.

The technical effect achieved by this system may be at least one of: (i) automated detection the identity of the caller; (ii) automated authentication of the identity of the caller; (iii) automated and/or simplified authentication procedures while caller is waiting in a call queue; (iv) tying the online identity of the caller with the phone call information; (v) improved speed in answering the needs of callers; (vi) higher level of assurance in the identity of the caller; (vii) reducing the potential for negatively impacting the caller; and/or (viii) obfuscating the authentication process from the view of the caller The methods and systems described herein may be implemented using computer programming or engineering techniques including computer software, firmware, hardware, or any combination or subset thereof, wherein the technical effects may be achieved by performing at least one of the following steps: (a) receiving, at a CA server, a phone call from a caller, where the phone call is initiated through an application on a remote computer device associated with the caller, and where the phone call includes one or more phone authentication credentials; (2) determining, by the CA server, a preliminary identity of the caller based upon the one or more phone authentication credentials; (3) receiving, at the CA server, online authentication credentials from the application on the remote computer device; (4) determining, by the CA server, a confirmed identity of the caller based, at least in part, on the one or more online credentials and the preliminary identity of the caller; and/or (5) displaying the confirmed identity of the caller to a user answering the phone call facilitate quickly and automatically authenticating the identity of the caller to prevent the caller from being negatively impacted by lengthy and potentially annoying authentication procedures.

Exemplary Process for Authenticating a Caller

FIG. 1 depicts a schematic diagram of a first embodiment of a process 100 of authenticating a caller using authentication credentials from both phone and online sources.

In the exemplary embodiment, a caller 105 may be associated with a remote computer device 110, such as a smartphone or cellphone. Remote computer device 110 may include at least one application 115. Application 115 may require caller 105 to log in to unlock and/or activate application 115. Application 115 may be configured to initiate a phone call to a phone number. In the exemplary embodiment, the phone call may be placed to a call center, where the call center may be a customer service call center. In other embodiments, the phone call may be to an individual or to a business. In the exemplary embodiment, application 115 may be installed on remote computer device 110, which is capable of placing cellular calls.

In process 100, application 115 may initiate a phone call through a separate component or application on remote computer device 110, such as a dialer application. In some embodiments, the dialer application may be integrated into application 115. In other embodiments, the phone call may be initiated through a voice over IP (VoIP) application or component. For example, remote computer device 110 may be a tablet device without cellular capabilities.

When application 115 initiates the phone call, application 115 may open a connection to a call authenticating (CA) server 140 through two paths. The first path may be through the phone 120. In this path, application 115 may call CA server 140 through a phone call. This call may use telephony based connection. As a part of the phone call, application 115 or remote computer device 110 may transmit phone credentials 125 along with the phone call to the CA server 140. While the phone call is being initiated, application 115 also may make a connection to CA server 140 through an online path 130. Application 115 may transmit online credentials 135 to CA server 140.

Phone credentials 125 may include, but are not limited to, automatic number identification (ANI), dialed number identification service results or inputs, phone authentication system inputs or results, and/or root check system results. Online credentials 135 may include, but are not limited to, a mobile device print, geolocation data, a user fingerprint, facial recognition information, public key infrastructure token, QR code, pincode, username+password, and/or acknowledgment of a successful accessing of application 115.

For example, online credentials 135 may be the credentials that caller 105 entered into application 115 to activate application 115. In other embodiments, online credentials 135 may be the credentials that caller 105 used to activate remote computer device 110.

CA server 140 may use both phone credentials 125 and online credentials 135 to authenticate caller 105. In the example embodiment, CA server 140 may use phone credentials 125 to determine a potential identity of caller 105, such as matching caller's phone number with caller's name in a database 520 (shown in FIG. 5). CA server 140 may then use online credentials 135 to confirm the caller's identity by comparing one or more of the received online credentials 135 with information stored in database 520. CA server 140 may then display the confirmed identity of caller 105 to a user 145, such as a customer care associate. For example, CA server 140 may cause the caller's name and phone number to appear on a computer device associated with user 145.

In some embodiments, CA server 140 may manage a queue of callers, where phone calls from callers are placed into the queue while waiting until a customer care associate is available to handle the next call in a queue. When CA server 140 receives a call, CA server 140 may place the call in the queue while authenticating the identity of caller 105. Once the identity of caller 105 has been confirmed, CA server 140 may then release the call from the queue and connect the call to the next available customer care associate.

In some embodiments, caller 105 has registered with the provider of the application and the call center. Caller 105 has provided identification and authentication information that the provider has stored in database 520 (shown in FIG. 5) that is accessible by CA server 140. For instance, caller 105 may be a policyholder with an insurance provider. Application 115 may be provided by the insurance provider and the call center may be a call center for the insurance provider, such as a customer service call center. Database 520 may be configured to store a plurality of pieces of information that may be used to confirm the identity of a caller.

In some embodiments, the identity of caller 105 may be associated with different levels of assurance. When caller 105 has been identified with the phone credentials 125, then the identity of caller 105 may be associated with at first level of assurance. When the identity of the caller has been confirmed with the online credentials 135, then the identity of caller 105 may be associated with a second level of assurance. The second level assurance being higher than the first level of assurance.

Figure 2:
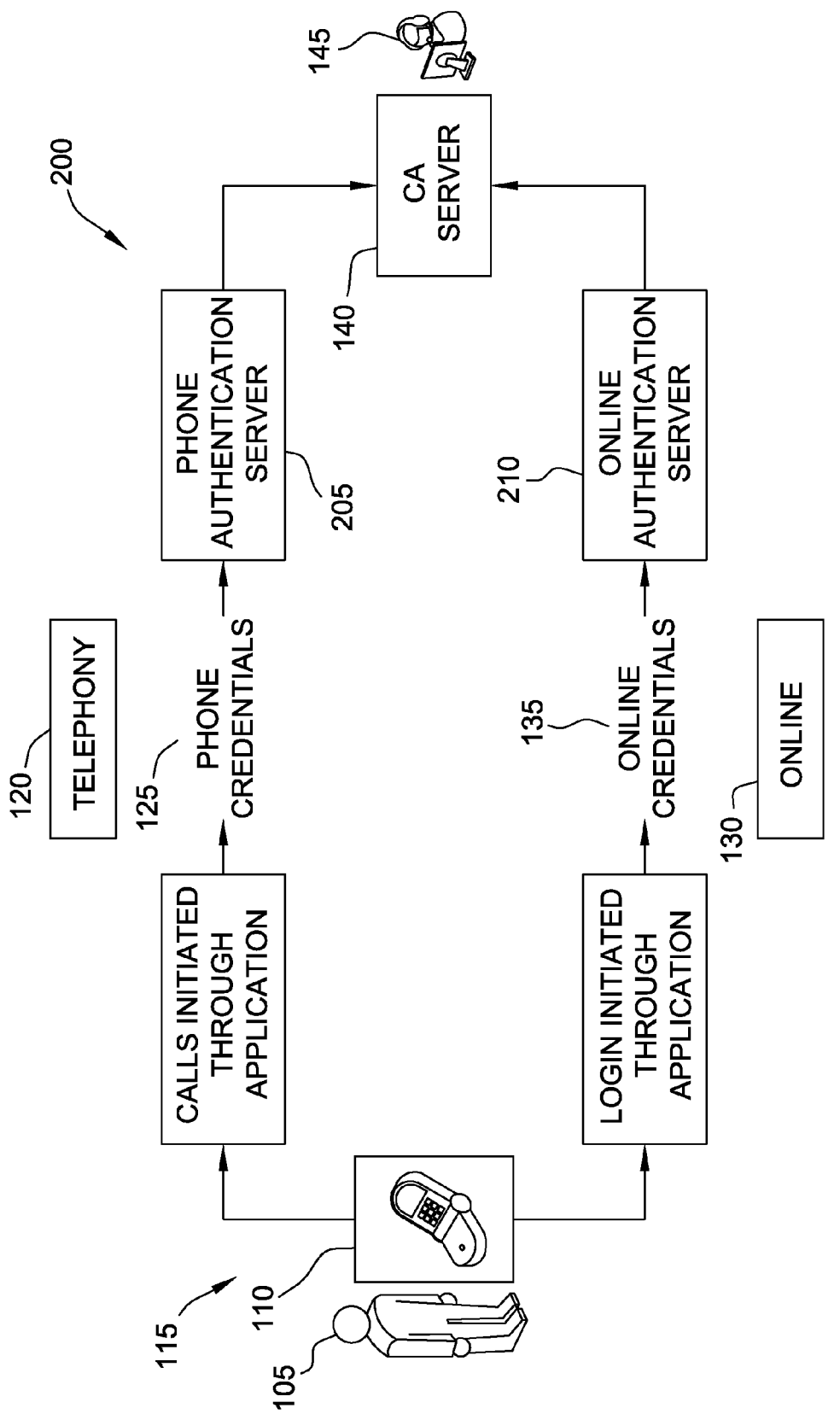
FIG. 2 illustrates a schematic diagram of a second exemplary embodiment of the process of authenticating a caller using authentication credentials from both phone and online sources.

FIG. 2 illustrates a schematic diagram of a second embodiment of an exemplary process 200 of authenticating caller 105 using authentication credentials from both phone and online sources. In process 200, application 115 may transmit phone credentials 125 to a phone authentication server 205. Phone authentication server 205 may process phone credentials 125 and transmit the results to CA server 140. Application 115 also may transmit online credentials 135 to an online authentication server 210. Online authentication server 210 may process online credentials 135 and transmit the results to CA server 140. In the exemplary embodiment, online authentication server 210 and phone authentication server 205 may be associated with CA server 140. In other embodiments, online authentication server 210 and phone authentication server 205 may be associated with third party authentication services which receive credentials and provide authentication results.

In other embodiments, there may be multiple online authentication servers 210 and/or phone authentication servers 205 in communication with CA server 140. Each server may provide a different type of authentication or analyze a different credential. Furthermore, the system may only include phone authentication servers 205 or online authentication servers 210. In still other embodiments, CA server 140 may receive phone credentials 125 and online credentials 135, where CA server 140 transmits the credentials to the corresponding authentication server.

Figure 3:
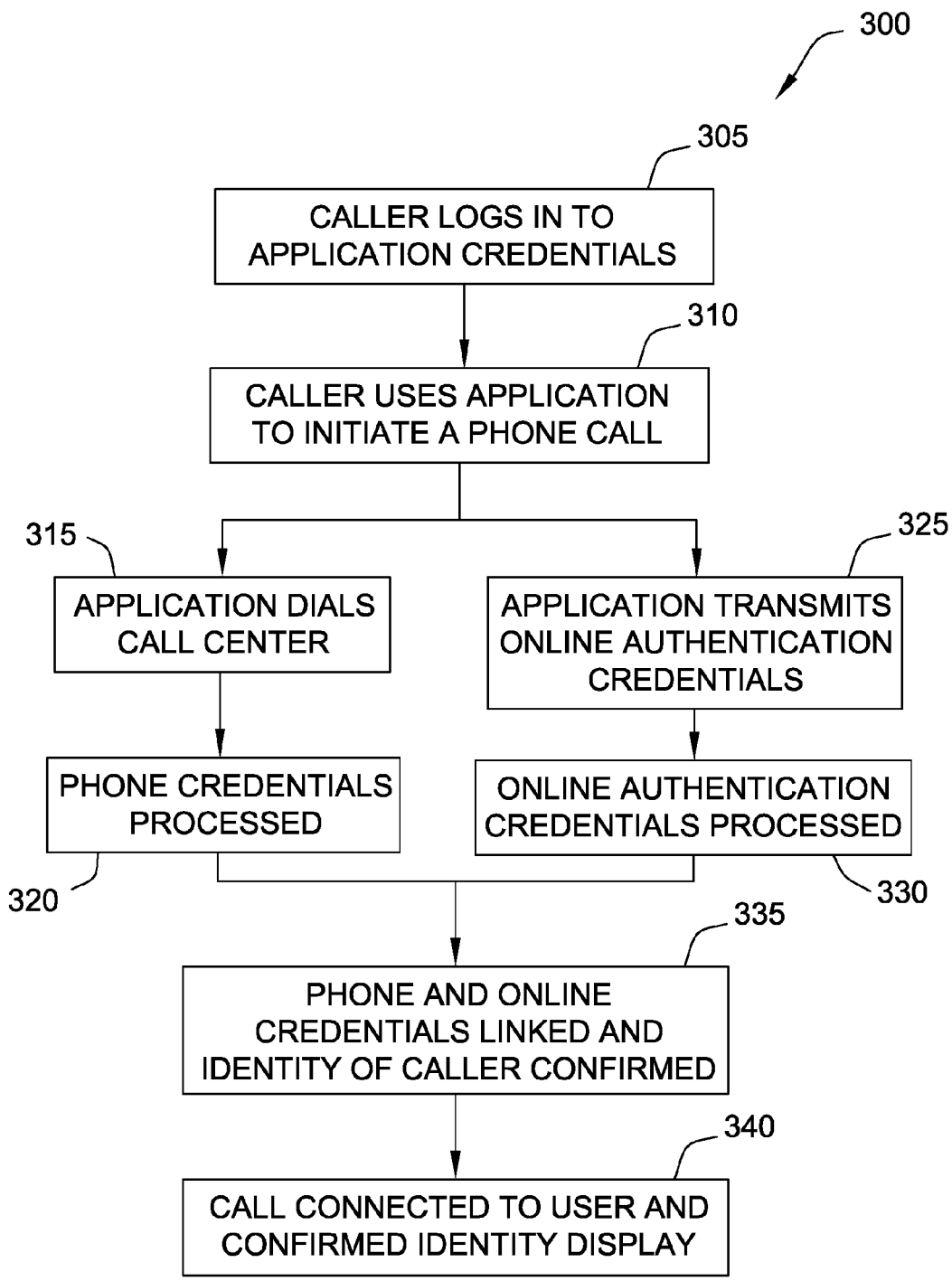
FIG. 3 illustrates a flow chart of an exemplary process for authenticating a caller using authentication credentials from both phone and online sources shown in FIG. 1.

FIG. 3 illustrates a flow chart of the exemplary process 300 for authenticating a caller using authentication credentials from both phone and online sources. The steps of process 300 may be implemented partially by application 115 and partially by CA server 140 (both shown in FIG. 1.)

In the exemplary embodiment, caller 105 (shown in FIG. 1) logs 305 into application 115 using credentials. For example, these credentials may include a username and password, a pin code, or a caller fingerprint. Caller 105 may use 310 application 115 to initiate a phone call, such as to a call center. Application 115 may dial 315 call center. Phone credentials 125 (shown in FIG. 1) may be processed 320. In some embodiments, processing 320 of phone credentials 125 may be performed by CA server 140. In other embodiments, processing 320 may be performed by one or more phone authentication servers 205 (shown in FIG. 2). Simultaneous to steps 315 and 320, application may transmit 325 online credentials 135 (shown in FIG. 1).

Then, the online credentials 135 may be processed 330. In some embodiments, processing 330 of online credentials 135 may be performed by CA server 140. In other embodiments, processing 330 may be performed by one or more online authentication servers 210 (shown in FIG. 2).

CA server 140 may link 335 phone credentials 125 and online credentials 135 to confirm the identity of caller 105. CA server 140 may connect 340 the call to user 145 (shown in FIG. 1) and cause the confirmed identity to be displayed to user 145.

In some embodiments, application 115 may include a session-based connection to CA server 140. The session-based connection may be set to expire based upon a time-out. For example, the time-out may be 30 seconds. After 30 seconds of inactivity on application 115, application 115 may close the session to conserve resources. However, while a phone call is connected through application 115, the session may remain open. Application 115 may override the timeout while the phone call is connected. In addition, Application 115 may receive a ping from CA server 140 to indicate that the phone call is active and to keep the session active.

In some embodiments, CA server 140 may transmit one or more inquiries to caller 105 through application 115. In these embodiments, application 115 may show the inquiry to caller 105. Application 115 may then receive the caller's input and transmits the caller inputs to CA server 140. In some of these embodiments, CA server 140 may transmit this inquiry while caller 105 is connected on the phone call.

Exemplary Computer-Implemented Method for Authenticating a Caller

Figure 4:
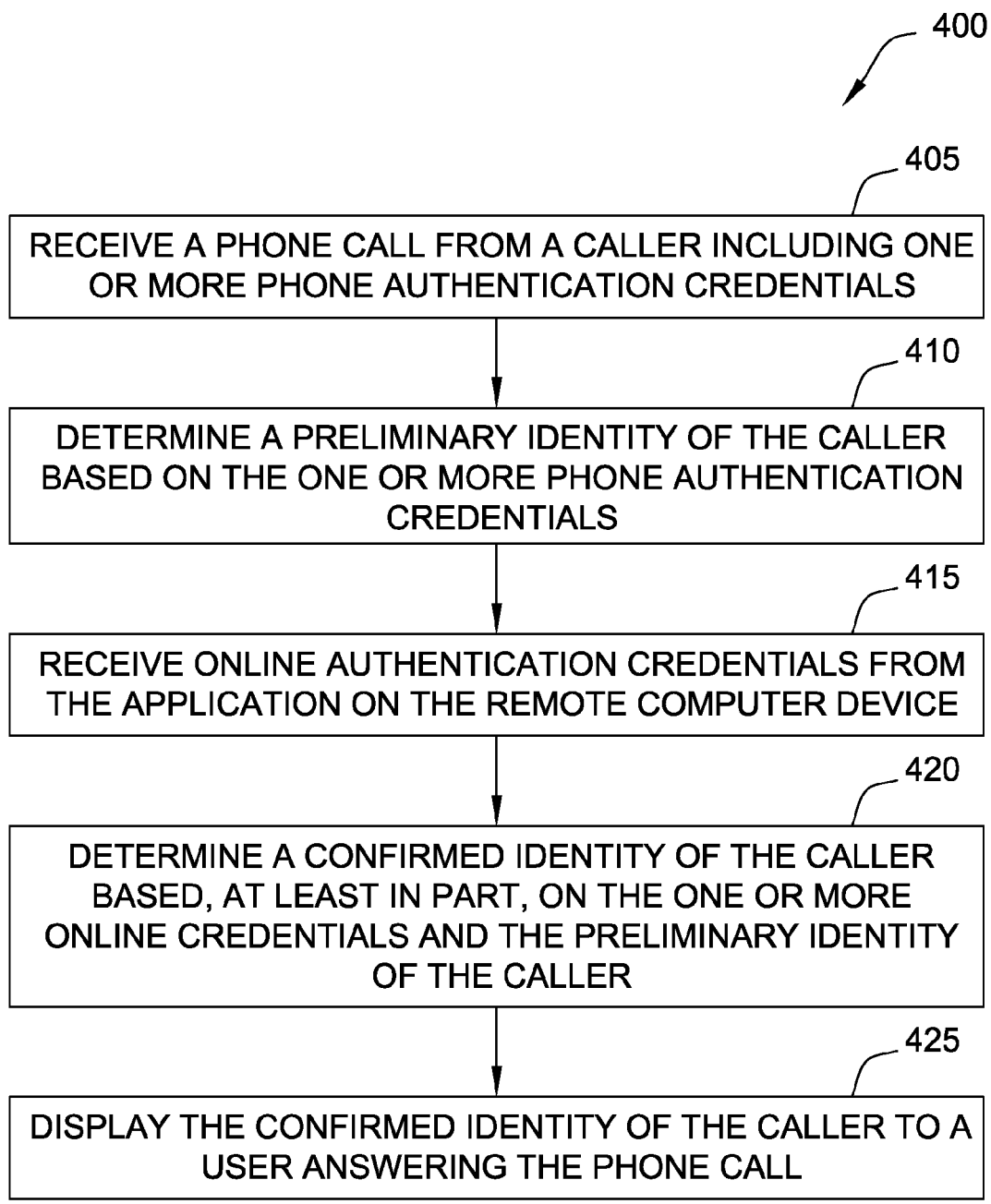
FIG. 4 illustrates a flow chart of an exemplary computer-implemented process for authenticating a caller using authentication credentials from both phone and online sources.

FIG. 4 illustrates a flow chart of an exemplary computer-implemented process 400 for authenticating a caller using authentication credentials from both phone and online sources as shown in FIG. 2. Process 400 may be implemented by a computing device, for example CA server 140 (shown in FIG. 1). In the exemplary embodiment, CA server 140 may be in communication with remote computer device 110, application 115, and user computer device 505 (shown in FIG. 5).

In the exemplary embodiment, CA server 140 may receive 405 a phone call from caller 105 including one or more phone authentication credentials 125 (both shown in FIG. 1.) CA server 140 may determine 410 a preliminary identity of caller 105 based upon the one or more phone authentication credentials 125. For example, CA server 140 may receive a phone number of caller 105 as one of the phone authentication credentials 125. CA server 140 compares the phone number with a database of stored identities to determine 410 a preliminary identity of caller 105 based upon the phone number.

CA server 140 may receive 415 online authentication credentials 135 (shown in FIG. 1) from application 115 on remote computer device 110. CA server 140 may use online authentication credentials 135 to determine a confirmed identity of caller 105 based, at least in part, on the one or more online authentication credentials 135 and the preliminary identity of caller 105. For example, CA server 140 may receive 415 a username and password that caller 105 used to log in to application 115. CA server 140 may compare the received username and password with information stored about caller 105 in database 520. If the username and password are confirmed, CA server 140 confirms 420 the identity of caller 105.

CA server 140 may transmit the confirmed identity of caller 105 to a computer device associated with user 145, so that the computer device will display 425 the confirmed identity of caller 105 to user 145. In the exemplary embodiment, user 145 may request caller's name when starting the call as a final check on the identity of caller 105.

Exemplary Computer Network

Figure 5:
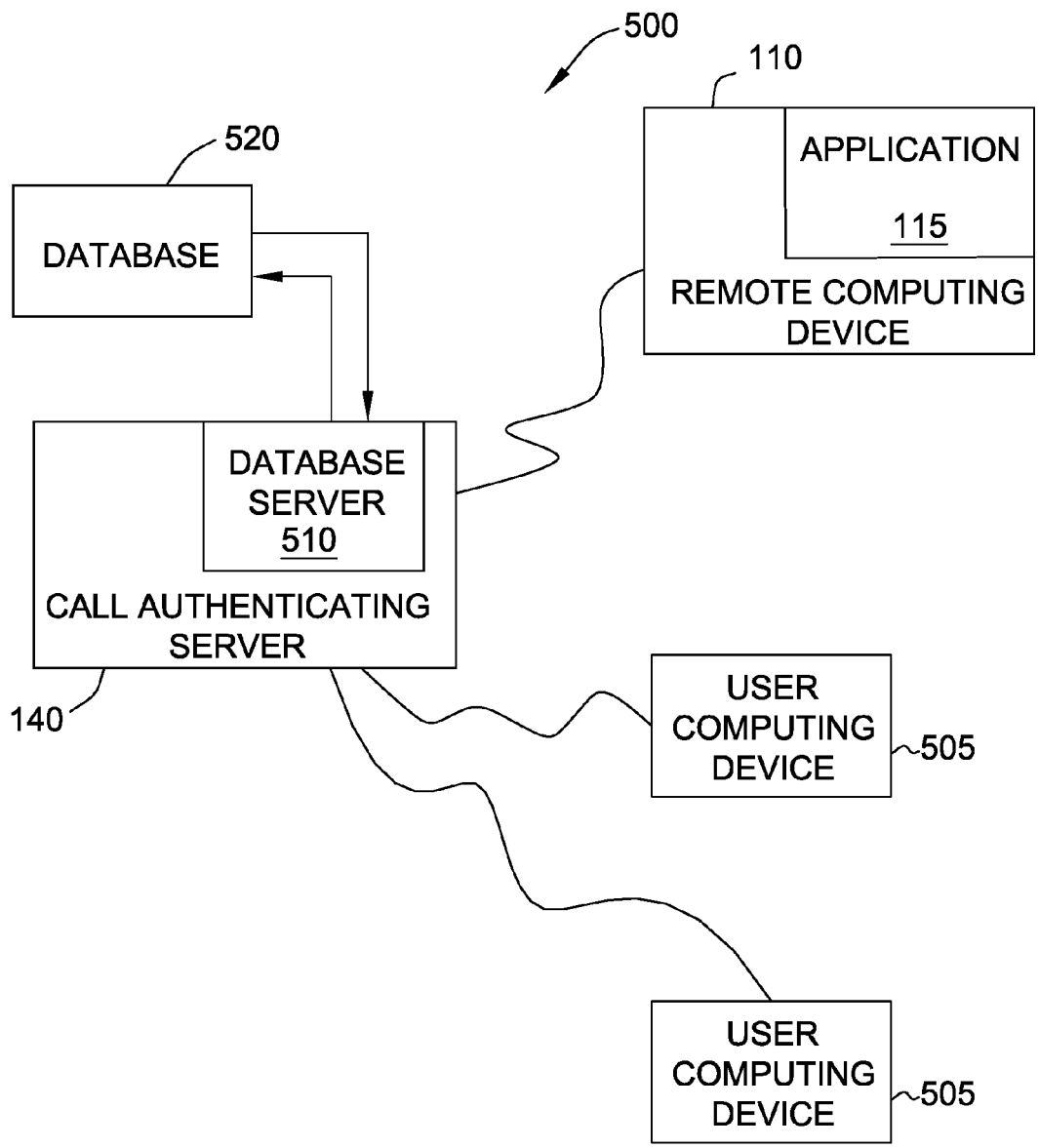
FIG. 5 illustrates a simplified block diagram of an exemplary system for implementing the process shown in FIG. 1.

FIG. 5 depicts a simplified block diagram of an exemplary system 500 for implementing process 100 shown in FIG. 1. In the exemplary embodiment, system 500 may be used for placing a caller in a queue, receiving both phone and online credentials, and authenticating the identity of the caller based upon the phone and online credentials. As described below in more detail, call authenticating ("CA") server 140 (shown in FIG. 1) may be configured to receive a phone call from a caller including phone authentication credentials, determine a preliminary identity of the caller based upon the one or more phone authentication credentials, receive online authentication credentials from the application on the remote computer device, determine a confirmed identity of the caller based, at least in part, on the one or more online credentials and the preliminary identity of the caller, and/or display the confirmed identity of the caller to a user answering the phone call.

In the exemplary embodiment, user computer devices 505 may be computers that include a web browser or a software application, which enables user computer devices 505 to access CA server 140 using the Internet or other network. More specifically, user computer devices 505 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 505 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 510 may be communicatively coupled to a database 520 that stores data. In one embodiment, database 520 may include phone authentication credentials, online authentication credentials, and/or listings of identities for callers. In the exemplary embodiment, database 520 may be stored remotely from CA server 140. In some embodiments, database 520 may be decentralized. In the exemplary embodiment, a person may access database 520 via user computer devices 505 by logging onto CA server 140, as described herein.

CA server 140 may be communicatively coupled with the user computer devices 505. In some embodiments, CA server 140 may be associated with, or is part of a computer network associated with call center, or in communication with the call center's computer network (not shown). In other embodiments, CA server 140 may be associated with a third party and is merely in communication with the call center's computer network. In some embodiments, the call center may be associated with an insurance provider.

One or more remote computer devices 110 may be communicatively coupled with CA server 140 through the Internet. In the exemplary embodiment, remote computer devices 110 may be computers that include a web browser or a software application (such as application 115), which enables remote computer devices 110 to access CA server 140 using the Internet or other network. More specifically, remote computer devices 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Remote computer devices 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment, application 115 may be a software program that allows remote computer device 110 to connect a phone call to user computer device 505 through CA server 140. Application 115 may include a plurality of phone numbers that when selected by a caller to initiate a phone call. Application 115 may include a dialer component or may be in communication with at a dialer component. In some embodiments, application 115 may initiate the phone call through a voice over IP (VoIP) component.

Exemplary Client Device

Figure 6:
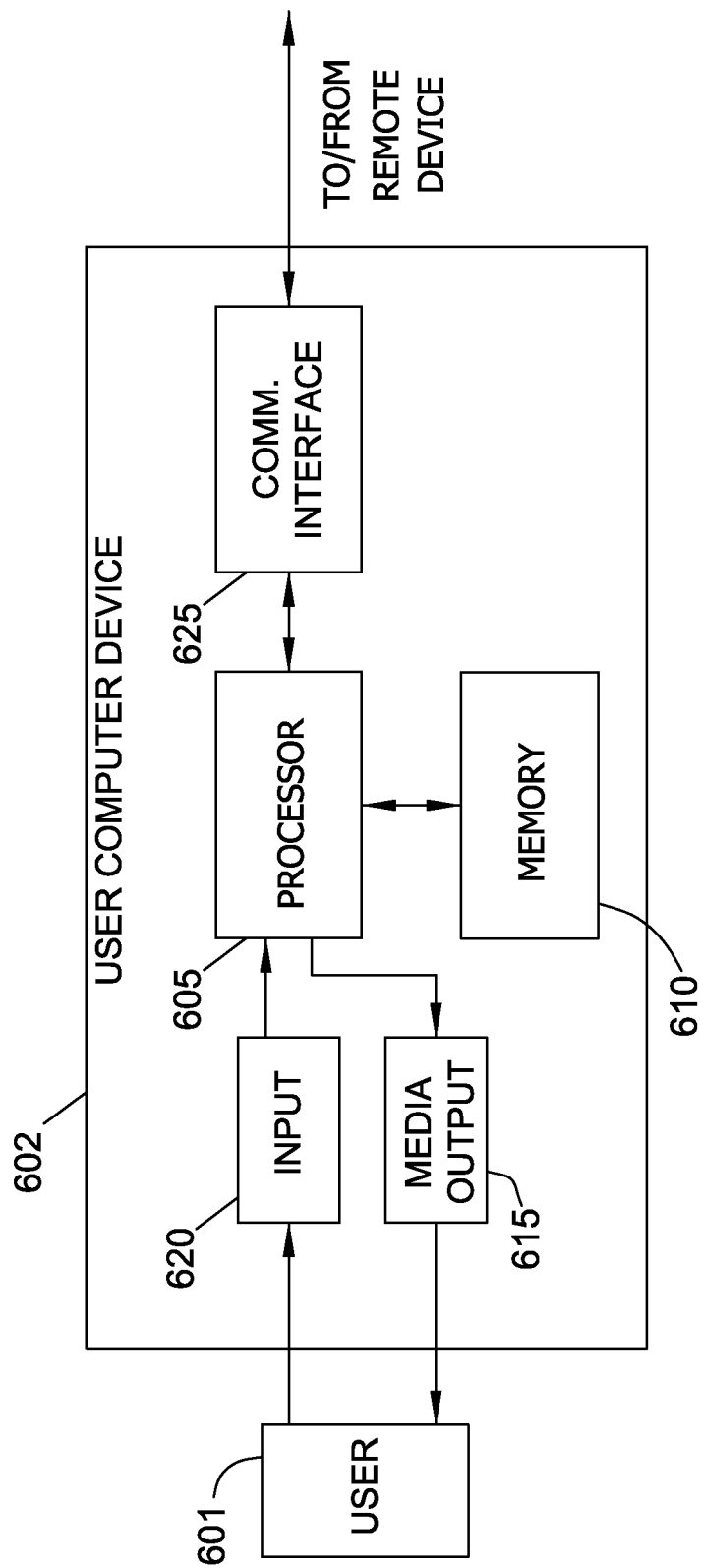
FIG. 6 illustrates an exemplary configuration of a client computer device shown in FIG. 5, in accordance with one embodiment of the present disclosure.

FIG. 6 depicts an exemplary configuration of a user computer device 505 shown in FIG. 5, in accordance with one embodiment of the present disclosure. User computer device 602 may be operated by a user 601. User computer device 602 may include, but is not limited to, user computer devices 505 (shown in FIG. 5) and remote computer device 110 (shown in FIG. 1). User computer device 602 may include a processor 605 for executing instructions. In some embodiments, executable instructions may be stored in a memory area 610. Processor 605 may include one or more processing units (e.g., in a multi-core configuration). Memory area 610 may be any device allowing information such as executable instructions and/or transaction data to be stored and retrieved. Memory area 610 may include one or more computer readable media.

User computer device 602 may also include at least one media output component 615 for presenting information to user 601. Media output component 615 may be any component capable of conveying information to user 601. In some embodiments, media output component 615 may include an output adapter (not shown) such as a video adapter and/or an audio adapter. An output adapter may be operatively coupled to processor 605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 615 may be configured to present a graphical user interface (e.g., a web browser and/or a client application) to user 601. A graphical user interface may include, for example, an online store interface for viewing and/or purchasing items, and/or a wallet application for managing payment information. In some embodiments, user computer device 602 may include an input device 620 for receiving input from user 601. User 601 may use input device 620 to, without limitation, select and/or enter one or more items to purchase and/or a purchase request, or to access credential information, and/or payment information.

Input device 620 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 615 and input device 620.

User computer device 602 may also include a communication interface 625, communicatively coupled to a remote device such as CA server 140 (shown in FIG. 1). Communication interface 625 may include, for example, a wired or wireless network adapter and/or a wireless data transceiver for use with a mobile telecommunications network.

Stored in memory area 610 are, for example, computer readable instructions for providing a user interface to user 601 via media output component 615 and, optionally, receiving and processing input from input device 620. A user interface may include, among other possibilities, a web browser and/or a client application. Web browsers enable users, such as user 601, to display and interact with media and other information typically embedded on a web page or a web site from CA server 140. A client application (such as application 115 shown in FIG. 1) allows user 601 to interact with, for example, CA server 140. For example, instructions may be stored by a cloud service, and the output of the execution of the instructions sent to the media output component 615.

Processor 605 executes computer-executable instructions for implementing aspects of the disclosure. In some embodiments, the processor 605 is transformed into a special purpose microprocessor by executing computer-executable instructions or by otherwise being programmed.

Exemplary Server Device

Figure 7:
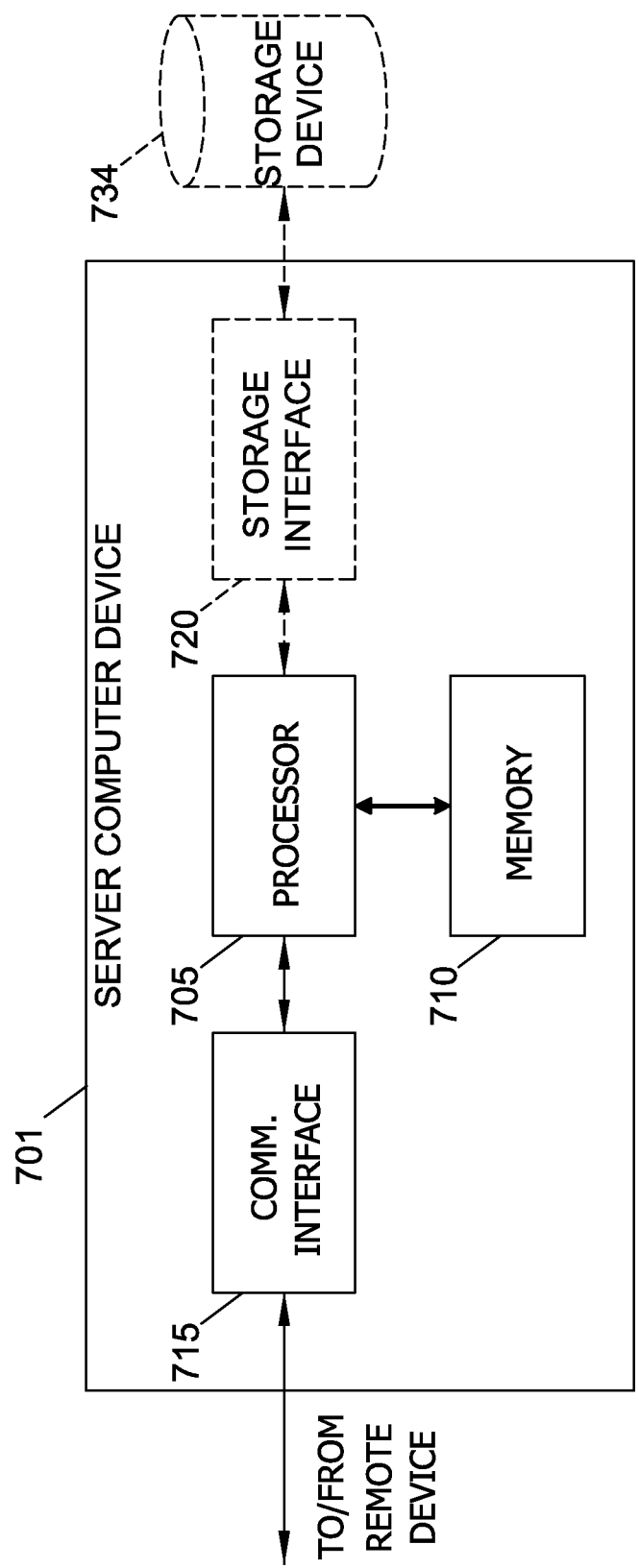
FIG. 7 illustrates an exemplary configuration of a server shown in FIG. 5, in accordance with one embodiment of the present disclosure.

FIG. 7 depicts an exemplary configuration of a server 140 shown in FIG. 5, in accordance with one exemplary embodiment of the present disclosure. Server computer device 701 may include, but is not limited to, database server 510 (shown in FIG. 5), CA server 140, phone authentication server 205, and online authentication server 210 (both shown in FIG. 2). Server computer device 701 may also include a processor 705 for executing instructions. Instructions may be stored in a memory area 710. Processor 705 may include one or more processing units (e.g., in a multi-core configuration).

Processor 705 may be operatively coupled to a communication interface 715 such that server computer device 701 is capable of communicating with a remote device, such as another server computer device 701, remote computer device 110 (shown in FIG. 1), user computer device 505 (shown in FIG. 5), phone authentication server 205, and/or online authentication server 210. For example, communication interface 715 may receive requests from remote computer devices 110 via the Internet, as illustrated in FIG. 5.

Processor 705 may also be operatively coupled to a storage device 734. Storage device 734 may be any computer-operated hardware suitable for storing and/or retrieving data, such as, but not limited to, data associated with database 520 (shown in FIG. 5). In some embodiments, storage device 734 may be integrated in server computer device 701. For example, server computer device 701 may include one or more hard disk drives as storage device 734.

In other embodiments, storage device 734 may be external to server computer device 701 and may be accessed by a plurality of server computer devices 701. For example, storage device 734 may include a storage area network (SAN), a network attached storage (NAS) system, and/or multiple storage units such as hard disks and/or solid state disks in a redundant array of inexpensive disks (RAID) configuration.

In some embodiments, processor 705 may be operatively coupled to storage device 734 via a storage interface 720. Storage interface 720 may be any component capable of providing processor 705 with access to storage device 734. Storage interface 720 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 734.

Processor 705 may execute computer-executable instructions for implementing aspects of the disclosure. In some embodiments, the processor 705 may be transformed into a special purpose microprocessor by executing computer-executable instructions or by otherwise being programmed. For example, the processor 705 may be programmed with the instruction such as illustrated in FIG. 4.

Exemplary Computer Device

Figure 8:
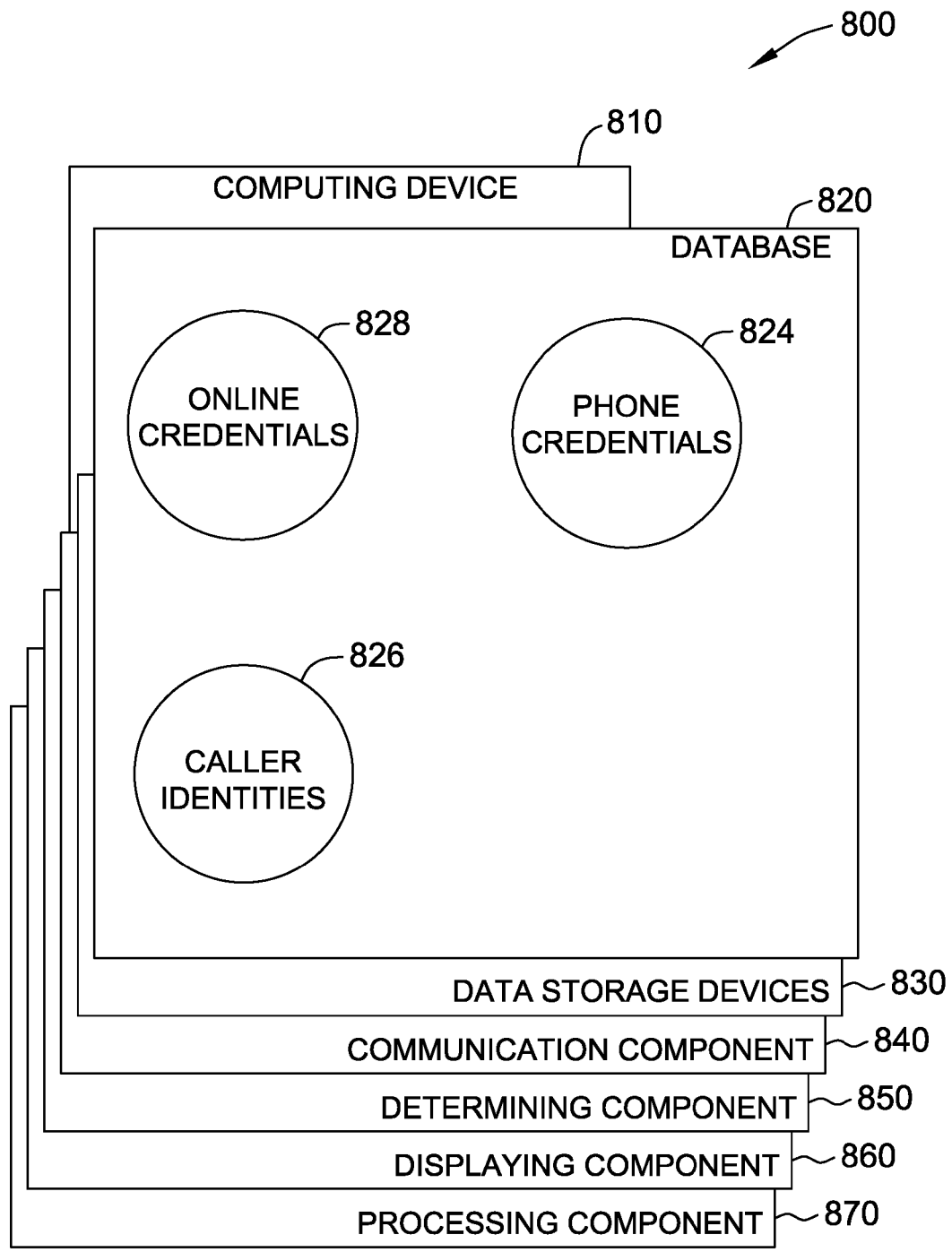
FIG. 8 illustrates a diagram of components of one or more exemplary computing devices that may be used in the system shown in FIG. 5.

FIG. 8 depicts a diagram 800 of components of one or more exemplary computing devices 810 that may be used in system 500 shown in FIG. 5. In some embodiments, computing device 810 may be similar to CA server 140 (shown in FIG. 1). Database 820 may be coupled with several separate components within computing device 810, which perform specific tasks. In this embodiment, database 820 may include online credentials 822 (such as online credentials 135 shown in FIG. 1), phone credentials 824 (such as phone credentials 125 shown in FIG. 1), and caller identities 826. In some embodiments, database 820 is similar to database 520 (shown in FIG. 5).

Computing device 810 may include the database 820, as well as data storage devices 830. Computing device 810 may also include a communication component 840 for receiving 405 a phone call and receiving 415 online authentication credentials (both shown in FIG. 4). Computing device 810 may also include a determining component 850 for determining 410 a preliminary identity and determining 420 a confirmed identity (both shown in FIG. 4). Computing device 810 may further include a displaying component 860 for displaying 425 the confirmed identity (shown in FIG. 4). A processing component 870 may assist with execution of computer-executable instructions associated with the system.

Exemplary Application

Figure 9:
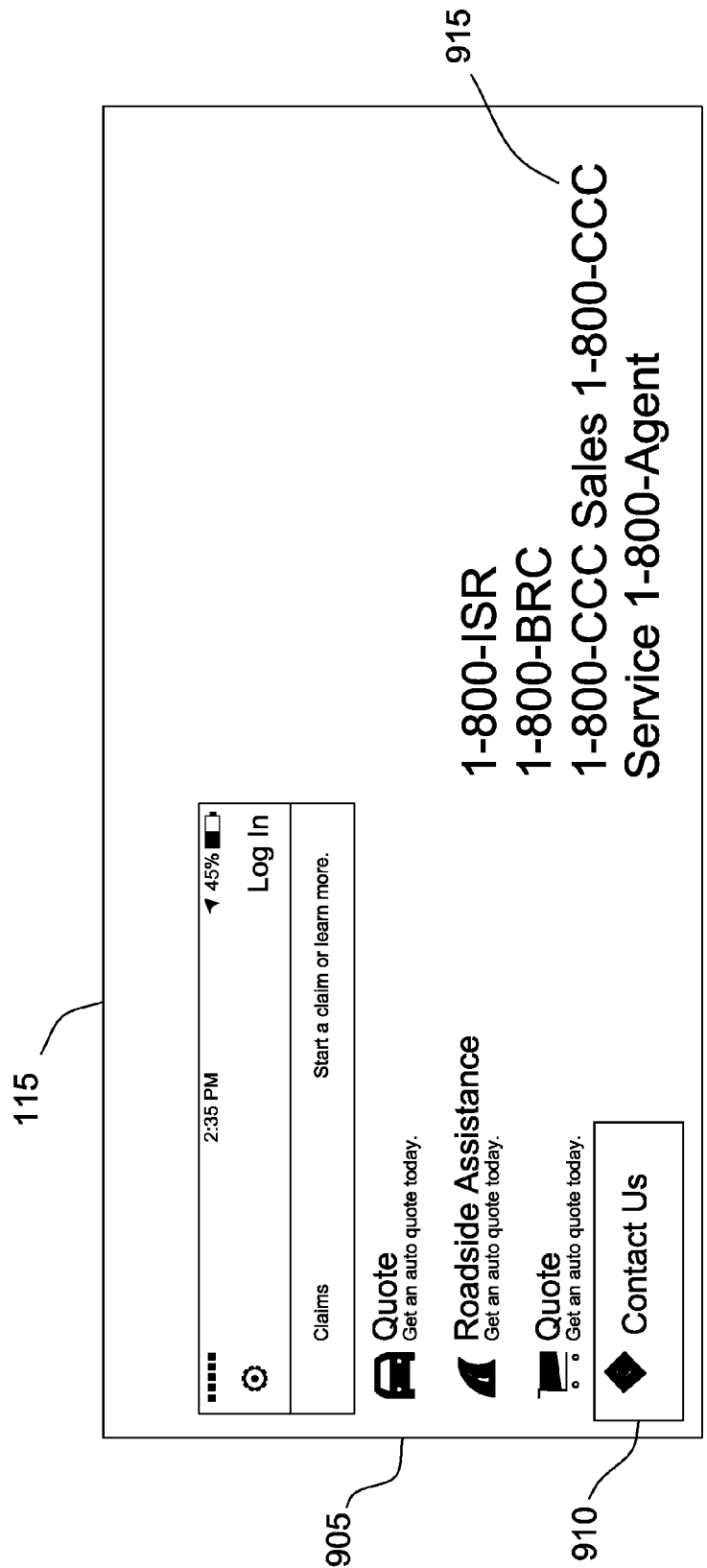
FIG. 9 depicts a mobile device application ("App") for use with authenticating a caller.

FIG. 9 depicts an exemplary mobile device application ("App") 115 for use with authenticating a caller. The App 115 may be running on the remote computer device 110 shown in FIG. 1. The App 115 may be provided by, or associated with, an insurance provider. Or the App 115 may be associated with any company or service that desires the users to contact a call center or customer service through the application. The App 115 may also be associated with users that desire to contact customer service without having to step through multiple authentication challenges. For instance, the App 115 may include a splash page 905, also known as a menu page that displays multiple options for the user to select. For example, one of the options may be a contact us 910. This may be a button or selection that the user may click on to select. In one embodiment, when the user selects the contact us 910 option, the App 115 may display further options 915 that the user/caller may select. These further options 915 may be phone numbers, departments, or services that the user/caller is looking to contact someone about.

Exemplary Detailed Embodiment

Figure 10A:
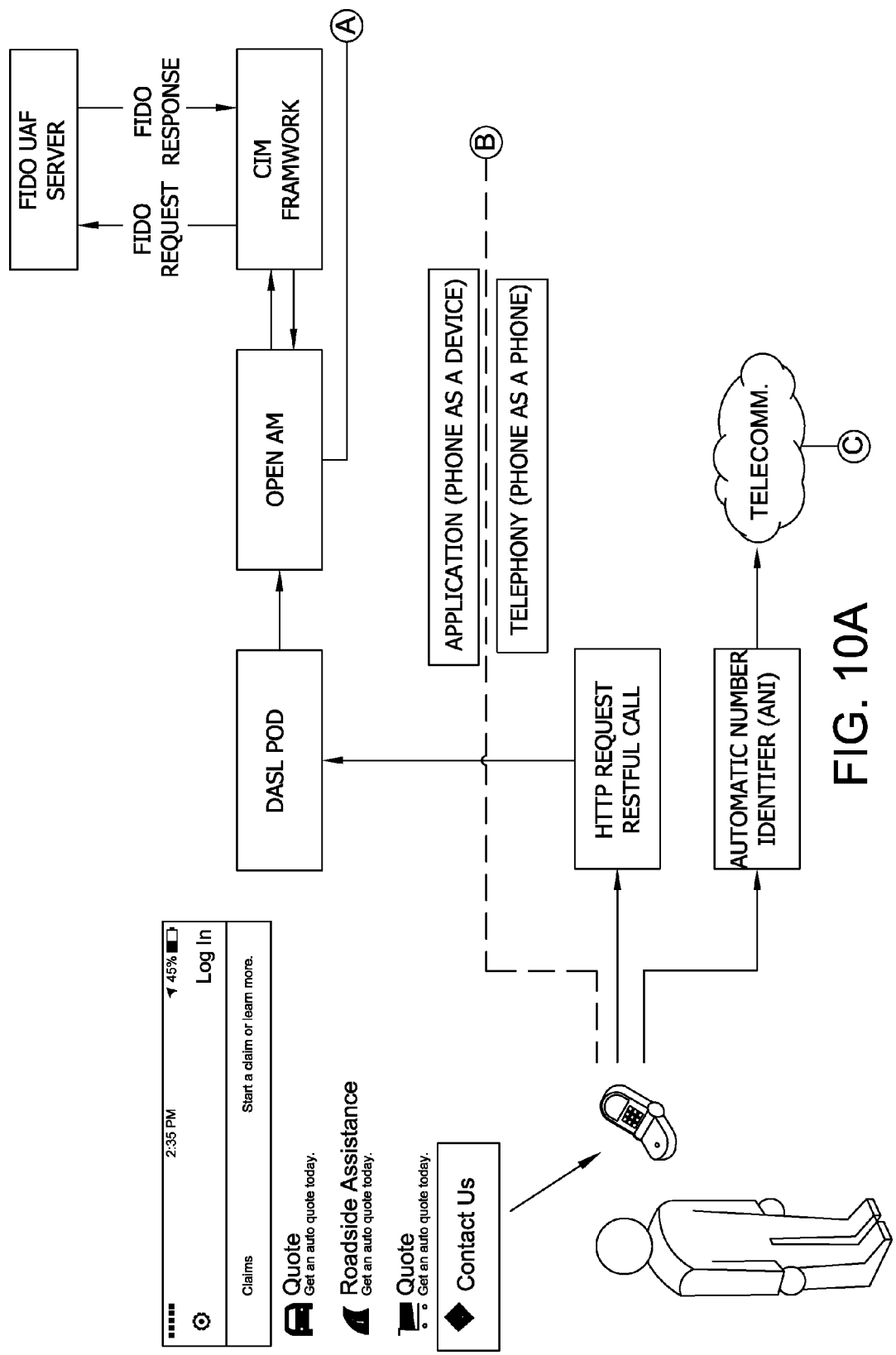
FIGS. 10A-10C depict an exemplary detailed schematic diagram of the process of authenticating a caller using authentication credentials from both phone and online sources where the caller initiated the call using an application.
Figure 10B:
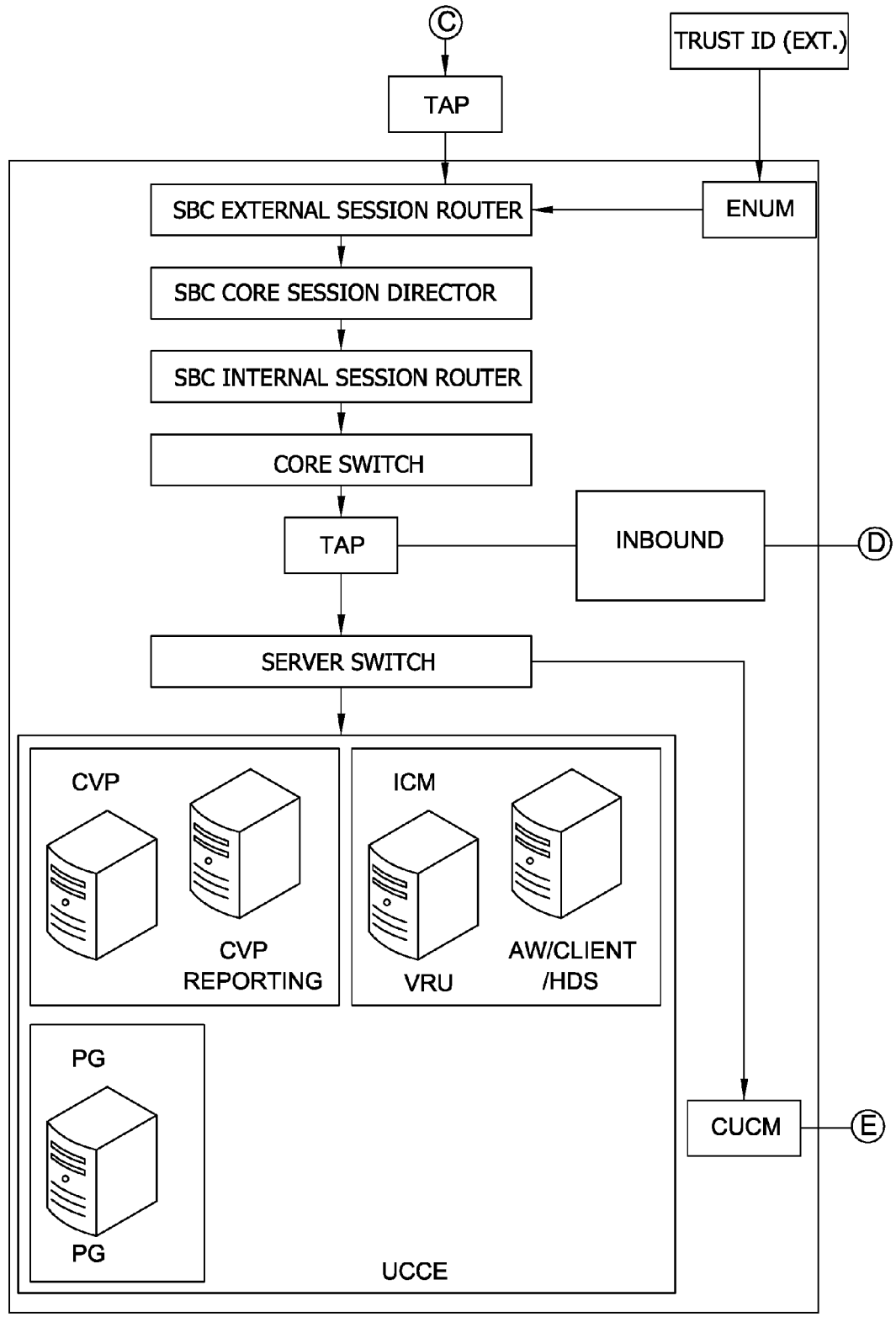
Figure 10C:
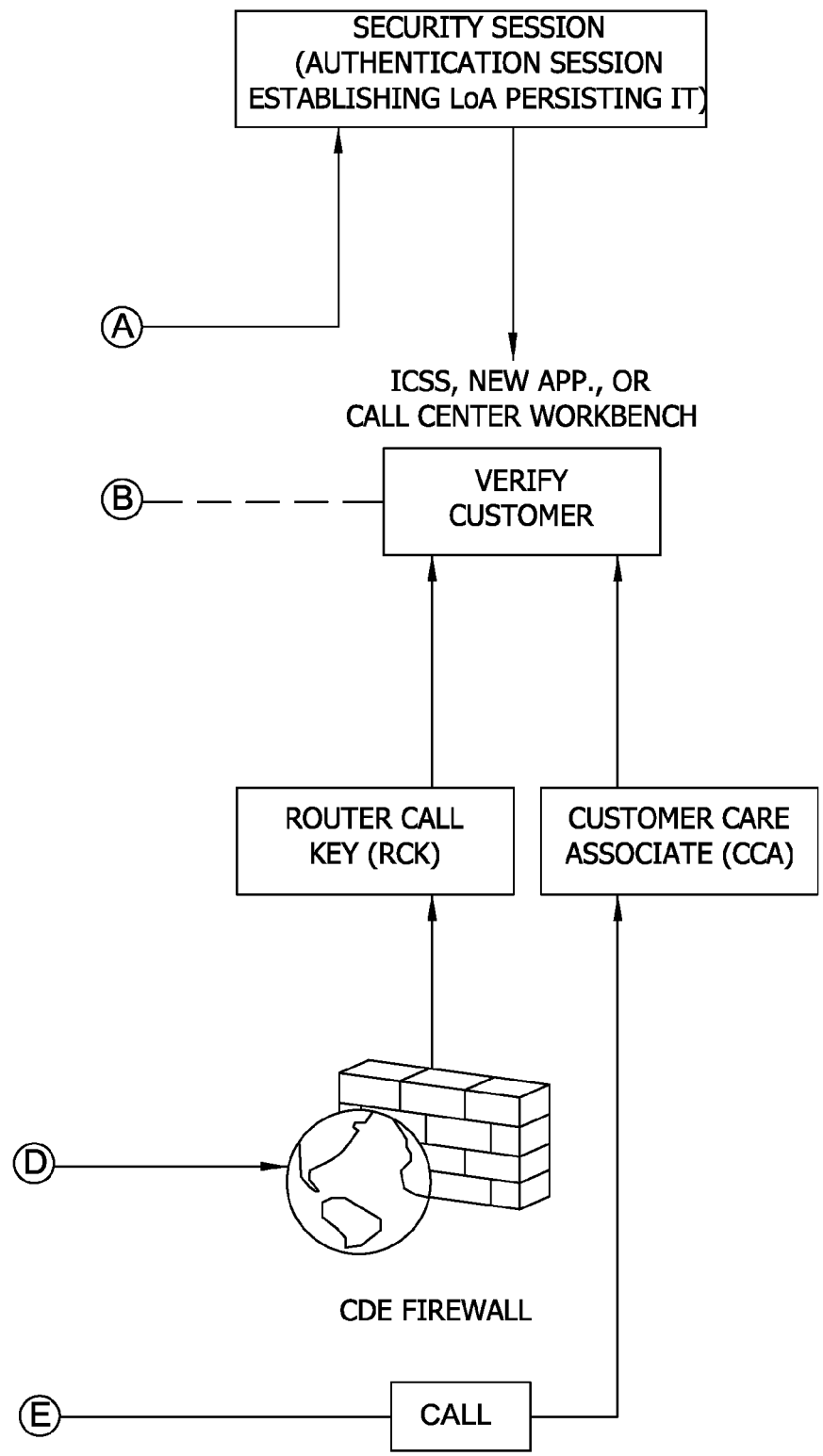

FIGS. 10A-10C depict an exemplary detailed schematic diagram of the process of authenticating a caller using authentication credentials from both phone and online sources where the caller initiated the call using an application. FIGS. 10A-10C outline one potential process and a plurality of devices and steps that would interact to perform the process of authenticating a caller using authentication credentials from both phone and online sources where the caller initiated the call using an application.

In FIGS. 10A-10C, a caller may use an application on their mobile device, such as the Pocket Agent application shown herein. By clicking on the Contact Us button, the caller may initiate a phone call to a customer care associate (CCA) at a call center. The mobile device and application may connect the call using a telecommunications network. The telecommunications network may use an automatic number identifier (ANI) service to automatically determine the originating phone number for the call (e.g., the number assigned to the caller device making the call). The telecommunications network may route the phone call to a network associated with the call center. The network may confirm the phone number by using an external automatic caller authentication server, such as TrustID show in the Figure. The network may route information about the phone call to the call center workbench to verify the customer. The routed information may include the phone credentials of the caller.

Simultaneously, the application may initiate a HTTP request using a representational state transfer (RESTful) call to transfer data to the call center workbench. The data may contain the online credentials of the caller. The data may be routed to an authentication server, such as OpenAM. The authentication server may route the data to a device authentication service, such as the FIDO UAF server shown in the Figure. If the device is authenticated, the authentication service may route the data to a security session, which may establish a level of assurance of the call. The online credentials and level of assurance of the call based on the call may then be transmitted to the call center workbench.

The call center workbench may combine the online credentials, the call level of assurance, and the information routed from the phone network. Based on the combined data, the call center workbench may instruct the network to release the call to the customer care associate. This process may occur automatically, without requiring additional input from the caller.

Exemplary Embodiments & Functionality

In one embodiment, a computer system for authenticating the identity of a caller may be provided. The computer system may (i) receive a phone call from a caller, wherein the phone call is initiated through an application on a remote computer device associated with the caller, wherein the phone call includes one or more phone authentication credentials; (ii) determine a preliminary identity of the caller based upon the one or more phone authentication credentials; (iii) receive online authentication credentials from the application on the remote computer device; (iv) determine a confirmed identity of the caller based, at least in part, on the one or more online credentials and the preliminary identity of the caller; and/or (v) display the confirmed identity of the caller to a user answering the phone call to facilitate quickly and automatically authenticating the identity of the caller to prevent the caller from being negatively impacted by lengthy and potentially annoying authentication procedures (e.g., answering a plurality of security questions and/or manually providing authentication information).

A further enhancement may be where the computer system may place the received phone call in a queue and release the phone call from the queue based upon determining a confirmed identity of the caller.

The computer system may achieve the above results by comparing the one or more phone authentication credentials with a stored database of identities, and determining the preliminary identity of the caller based upon the comparison. The computer system may further compare the one or more online credentials with the preliminary identity of the caller and a database of identities. The database of identities may include a plurality of identities, wherein the database may be configured to be searched based upon phone number. The computer system may then determine a confirmed identity of the caller based upon the comparison.

The computer system described herein may be a mobile phone associated with the caller. Then the application may initiate the phone call using a dialing application on the mobile phone. The computer system described here may instead require the application to initiate the phone call using a voice over IP application on the remote computer device.

Phone authentication credentials described herein may include at least one of a phone authentication system, data verification system, automatic number identification, dialed number identification service, and/or a root check system result.

Online authentication credentials described herein may include at least one of a mobile device print, geolocation data, a user fingerprint, facial recognition information, public key infrastructure token, QR code, pincode, and/or username+password.

A further enhancement may be where the computer system may receive login information from the caller to access the application. The application may then transmit at least one of the login information and an acknowledgement of the login information in the online authentication credentials. This login information may include a caller fingerprint and the acknowledgement may be a verification code.

An additional component of the present embodiments may be a third-party server. The computer system may not perform authentication itself, and may instead transmit at least one of the online authentication credentials and the phone authentication credentials to the third-party server for verification.

A further enhancement may be where the computer system described herein may be associated with a call center and the user is a call center associate who receives the phone call and may be associated with a call center. The confirmed identity of the caller and associated phone number may be displayed to the user/call center associate.

A further enhancement may include levels of assurance. Under these levels of assurance the preliminary identity of the caller may be associated with a first level of assurance. The confirmed identity of the caller may be associated with a second level of assurance, wherein the second level of assurance is higher than the first level of assurance. There may be additional levels assurance above, below, or in between, the first and second levels of assurance.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant phone credentials and/or online credentials for the caller from device details, login details, mobile device sensors, geolocation information, image data, and/or other data.

In one embodiment, a processing element may be trained by providing it with a large sample of phone and/or online credentials with known characteristics or features. Such information may include, for example, fingerprint, device print, verification codes, PBQA, and/or passive voice analysis.

Based upon these analyses, the processing element may learn how to identify characteristics and patterns that may then be applied to analyzing sensor data, authentication data, image data, mobile device data, and/or other data. For example, the processing element may learn, with the caller's permission or affirmative consent, to identify the caller by name and phone number based upon any of a plurality of credential types. As a result, at the time of a call placed by the caller, providing quick and automatic authentication of the identity of the caller to prevent the caller from being negatively impacted by lengthy and potentially annoying authentication procedures (e.g., answering a plurality of security questions and/or manually providing authentication information).

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. §112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer system for authenticating the identity of a caller, the computer system including at least one processor in communication with at least one memory device, the at least one processor is programmed to:
   receive a phone call from a caller, wherein the phone call is initiated through an application on a remote computer device associated with the caller, wherein the phone call includes one or more phone authentication credentials;
   determine a preliminary identity of the caller based upon the one or more phone authentication credentials;
   receive online authentication credentials from the application on the remote computer device;

determine a confirmed identity of the caller based, at least in part, upon the one or more online credentials and the preliminary identity of the caller; and transfer the confirmed identity of the caller to a computer device associated with a user answering the phone call to facilitate caller identity authentication, wherein the computer device is configured to display the confirmed identity of the caller to the user.

2. The computer system of claim 1, wherein the processor is further configured to:

place the received phone call in a queue; and release the phone call from the queue based upon determining a confirmed identity of the caller.

3. The computer system of claim 1, wherein the processor is further configured to;

compare the one or more phone authentication credentials with a stored database of identities; and determine the preliminary identity of the caller based upon the comparison.

4. The computer system of claim 1, wherein the processor is further configured to:

compare the one or more online credentials with the preliminary identity of the caller; and determine a confirmed identity of the caller based upon the comparison.

5. The computer system of claim 4 wherein the processor is further configured to compare the one or more online credentials with the preliminary identity and a database of identities.

6. The computer system of claim 1, wherein the remote computer device is a mobile phone associated with the caller, and wherein the application initiates the phone call using a dialing application on the mobile phone.

7. The computer system of claim 1, wherein the application initiates the phone call using a voice over IP application on the remote computer device.

8. The computer system of claim 1, wherein the phone authentication credentials include at least one of a phone authentication system, data verification system, automatic number identification, dialed number identification service, and a root check system result.

9. The computer system of claim 1, wherein the online authentication credentials include at least one of a mobile device print, geolocation data, a user fingerprint, facial recognition information, public key infrastructure token, QR code, pincode, and username+password.

10. The computer system of claim 1, wherein the at least one processor is further programmed to store a database that includes a plurality of identities, wherein the database is configured to be searched based upon phone number.

11. The computer system of claim 1, wherein the application is configured to receive login information from the caller to access the application, and wherein the application is further configured to transmit at least one of the login information and an acknowledgement of the login information in the online authentication credentials.

12. The computer system of claim 11, wherein the application is further configured to receive a caller fingerprint as login information.

13. The computer system of claim 11, wherein the acknowledgement is a verification code.

14. The computer system of claim 1, wherein the at least one processor is further programmed to transmit at least one of the online authentication credentials and the phone authentication credentials to a third-party server for verification.

15. The computer system of claim 1, wherein the user receiving the phone call is associated with a call center.

16. The computer system of claim 1, wherein the preliminary identity of the caller is associated with a first level of assurance, and wherein the confirmed identity of the caller is associated with a second level of assurance, wherein the second level of assurance is higher than the first level of assurance.

17. The computer system of claim 1, wherein the displayed confirmed identity of caller includes a caller name and a phone number associated with the phone call.

18. A computer-based method for authenticating the identity of a caller, the method implemented on a call authenticating ("CA") server including at least one processor in communication with at least one memory device, the method comprising:

receiving, at the CA server, a phone call from a caller, wherein the phone call is initiated through an application on a remote computer device associated with the caller, wherein the phone call includes one or more phone authentication credentials;

determining, by the CA server, a preliminary identity of the caller based upon the one or more phone authentication credentials;

receiving, at the CA server, online authentication credentials from the application on the remote computer device;

determining, by the CA server, a confirmed identity of the caller based, at least in part, upon the one or more online credentials and the preliminary identity of the caller; and transferring the confirmed identity of the caller to a computer device associated with a user answering the phone call to facilitate caller identity authentication, wherein the computer device is configured to display the confirmed identity of the caller to the user.

19. The method of claim 18 further comprising:

placing the received phone call in a queue; and releasing the phone call from the queue based upon determining a confirmed identity of the caller.

20. The method of claim 18 further comprising:

comparing the one or more phone authentication credentials with a stored database of identities; and determining the preliminary identity of the caller based upon the comparison.

* * * * *